(12) United States Patent
Amicangioli et al.

(10) Patent No.: US 11,328,357 B2
(45) Date of Patent: May 10, 2022

(54) SEQUENCER BYPASS WITH TRANSACTIONAL PREPROCESSING IN DISTRIBUTED SYSTEM

(71) Applicant: Hyannis Port Research, Inc., Needham, MA (US)

(72) Inventors: Anthony D. Amicangioli, Newton, MA (US); Allen Bast, Sharon, MA (US)

(73) Assignee: HYANNIS PORT RESEARCH, INC., Needham, MA (US)

( * ) Notice: Subject to any disclaimer, the term of this patent is extended or adjusted under 35 U.S.C. 154(b) by 0 days.

(21) Appl. No.: 16/988,491

(22) Filed: Aug. 7, 2020

(65) Prior Publication Data

US 2022/0044318 A1   Feb. 10, 2022

(51) Int. Cl.
*G06Q 40/04* (2012.01)
*H04L 47/34* (2022.01)
(Continued)

(52) U.S. Cl.
CPC ......... *G06Q 40/04* (2013.01); *G06F 16/2379* (2019.01); *G06Q 20/027* (2013.01);
(Continued)

(58) Field of Classification Search
CPC .. G06Q 40/04; G06Q 20/027; G06F 16/2379; H04L 12/66; H04L 47/34; H04L 67/12
(Continued)

(56) References Cited

U.S. PATENT DOCUMENTS 6,697,331 B1   2/2004 Riihinen et al.
6,996,062 B1   2/2006 Freed et al.
(Continued)

FOREIGN PATENT DOCUMENTS

EP   1968275 A1 * 9/2008 ............ H04W 28/06
EP   3438830 A1   2/2019
(Continued)

OTHER PUBLICATIONS

Title: Design and Analysis of a Distributed Multi-leg Stock Trading System Authors: Jia Zou et al. Date: Jan. 6, 2011 Published in: 2011 31st International Conference on Distributed Computing Systems (Year: 2011).*
(Continued)

*Primary Examiner* — Christopher Bridges
*Assistant Examiner* — Yongsik Park
(74) *Attorney, Agent, or Firm* — Hamilton, Brook, Smith & Reynolds, P.C.

(57) ABSTRACT

A distributed system for processing messages includes one or more gateways, sequencers, and compute nodes. The gateway sends a message to the sequencer and the compute node for processing. The sequencer associates the message with an identifier indicating a relative sequence of the message among a plurality of messages. The compute node processes the message to generate a preliminary result, and determines, based on the identifier, whether the compute node processed the message in sequence or out of sequence relative to another message of a plurality of messages. If the compute node determines that the message was received out of sequence, the compute node may process a sequence of messages including the message and at least one preceding message in an appropriate sequence.

19 Claims, 7 Drawing Sheets

(51) Int. Cl.
*G06F 16/23* (2019.01)
*H04L 67/12* (2022.01)
*G06Q 20/02* (2012.01)
*H04L 12/66* (2006.01)

(52) U.S. Cl.
CPC .............. *H04L 12/66* (2013.01); *H04L 47/34* (2013.01); *H04L 67/12* (2013.01)

(58) Field of Classification Search
USPC ......................................................... 705/37
See application file for complete search history.

(56) References Cited

U.S. PATENT DOCUMENTS

| | | | |
|---|---|---|---|
| 7,023,833 B1 | 4/2006 | Aiello et al. | |
| 7,496,086 B2 | 2/2009 | Eckberg et al. | |
| 7,720,043 B2 | 5/2010 | Meylan et al. | |
| 7,876,740 B2 | 1/2011 | Eastwood et al. | |
| 7,876,751 B2 | 1/2011 | Benner et al. | |
| 7,885,296 B2 | 2/2011 | Biederman et al. | |
| 7,948,883 B1 | 5/2011 | Croft et al. | |
| 8,923,341 B2 | 12/2014 | Barnette et al. | |
| 9,691,102 B2* | 6/2017 | Studnitzer ............... | G06Q 40/06 |
| 9,712,606 B2* | 7/2017 | Farnlof ................... | H04L 67/10 |
| 9,929,743 B1* | 3/2018 | Acuña-Rohter ....... | G06Q 40/04 |
| 10,104,148 B2 | 10/2018 | Yang et al. | |
| 10,262,365 B2* | 4/2019 | Venkataraman ....... | G06Q 40/04 |
| 10,417,709 B2* | 9/2019 | Hosman ................. | G06Q 40/04 |
| 10,467,693 B2* | 11/2019 | Studnitzer .............. | G06Q 40/04 |
| 10,504,183 B2* | 12/2019 | Venkataraman ....... | G06Q 40/06 |
| 10,585,729 B2* | 3/2020 | Vaccaro .............. | G06F 16/9024 |
| 10,637,967 B2* | 4/2020 | Bonig ..................... | H04L 67/42 |
| 10,699,336 B2 | 6/2020 | Burkhardt et al. | |
| 2003/0065974 A1 | 4/2003 | Lam | |
| 2003/0235209 A1 | 12/2003 | Garg et al. | |
| 2004/0215753 A1 | 10/2004 | Chan et al. | |
| 2004/0246897 A1 | 12/2004 | Ma et al. | |
| 2007/0255855 A1 | 11/2007 | Knapp et al. | |
| 2008/0069118 A1 | 3/2008 | Monier | |
| 2008/0084833 A1 | 4/2008 | Picard | |
| 2010/0046368 A1 | 2/2010 | Kaempfer et al. | |
| 2010/0318673 A1 | 12/2010 | Kemp et al. | |
| 2011/0194409 A1 | 8/2011 | Ofelt et al. | |
| 2011/0264577 A1* | 10/2011 | Winbom ................. | G06Q 40/04 705/37 |
| 2012/0044940 A1 | 2/2012 | Katz et al. | |
| 2012/0093022 A1 | 4/2012 | Wang | |
| 2012/0131221 A1 | 5/2012 | Foygel et al. | |
| 2012/0195203 A1 | 8/2012 | Godbole et al. | |
| 2012/0317011 A1* | 12/2012 | Duquette ............... | G06Q 40/04 705/37 |
| 2015/0078376 A1 | 3/2015 | Wisehart | |
| 2015/0081508 A1 | 3/2015 | Schwall et al. | |
| 2015/0195202 A1 | 7/2015 | Ogura | |
| 2015/0341422 A1* | 11/2015 | Färnlöf ................... | H04L 67/10 709/202 |
| 2015/0356679 A1* | 12/2015 | Schmitt ................. | G06Q 40/04 705/37 |
| 2016/0028637 A1 | 1/2016 | Vasseur et al. | |
| 2016/0063628 A1* | 3/2016 | Kreider ................. | H04L 63/083 705/37 |
| 2016/0119080 A1 | 4/2016 | Gineste | |
| 2016/0294921 A1* | 10/2016 | Meng .................. | H04L 67/1095 |
| 2017/0127341 A1 | 5/2017 | Di Marco | |
| 2017/0236203 A1 | 8/2017 | Amicangioli | |
| 2018/0047099 A1 | 2/2018 | Bonig et al. | |
| 2018/0167492 A1* | 6/2018 | Bonig .................. | G06Q 20/085 |
| 2018/0279934 A1 | 10/2018 | Wo | |
| 2018/0317121 A1 | 11/2018 | Liao et al. | |
| 2018/0359195 A1 | 12/2018 | Shah et al. | |
| 2019/0097745 A1 | 3/2019 | Mallela et al. | |
| 2019/0222442 A1 | 7/2019 | Wei | |
| 2019/0259099 A1* | 8/2019 | Katsuyama ............ | G06Q 40/04 |
| 2019/0349309 A1 | 11/2019 | Bonig | |
| 2019/0379768 A1 | 12/2019 | Amicangioli et al. | |
| 2020/0034929 A1 | 1/2020 | Rao | |
| 2020/0104269 A1 | 4/2020 | Pope et al. | |
| 2020/0134720 A1* | 4/2020 | Katsuyama ............. | H04L 47/12 |
| 2020/0167865 A1* | 5/2020 | Craig ..................... | G06Q 40/04 |
| 2020/0169355 A1 | 5/2020 | McIlroy | |
| 2020/0187274 A1 | 6/2020 | Rune et al. | |

FOREIGN PATENT DOCUMENTS

| | | |
|---|---|---|
| JP | 2019050013 A | 3/2019 |
| WO | 2012144999 A2 | 10/2012 |
| WO | 2018106350 A1 | 6/2018 |
| WO | 2018/183542 A1 | 10/2018 |

OTHER PUBLICATIONS

"Determinism is the new latency," Arista.com, Solution Brief (Jan. 23, 2019).
"ICON® Deterministic Packet Transport," SEL Schweitzer Engineering Laboratories (2016).
https://tools.ietf.org/html/draft-geng-detnet-requirements-bounded-latency-03; "Requirements of Layer 3 Deterministic Latency Service draft-geng-detnet-requirements-bounded-latency-03," (Mar. 4, 2020).
"Configuring Queuing and Flow Control," Cisco Nexus 5000 Series NX-OS Quality of Service Configuration Guide, Release 5.2(1)N1(1) (Jan. 26, 2018).
Qiu et al., "Hierarchy Virtual Queue Based Flow Control in LTE/SAE," 2010 Second International Conference on Future Networks, pp. 78-82 (2010).
International Search Report and Written Opinion received for PCT Application No. PCT/US2021/044747, dated Dec. 9, 2021, 13 pages.
International Search Report and Written Opinion received for PCT Application No. PCT/US2021/044754, dated Dec. 23, 2021, 13 pages.
International Search Report and Written Opinion received for PCT Patent Application No. PCT/US2021/044591, dated Nov. 23, 2021, 8 pages.

* cited by examiner

SEQUENCER BYPASS WITH TRANSACTIONAL PREPROCESSING IN DISTRIBUTED SYSTEM

BACKGROUND

Typical electronic trading systems performing order matching make use of a traditional networked architecture, in which multiple computing hosts communicate with one another over a shared network through a common network switch. A number of gateway hosts operate as interfaces between client trader devices operating on the front end and a network of matching engines operating on the back end. The gateway nodes, matching engine, and sequencer nodes all communicate over the same shared matching engine network through traditional internetworking devices such as switches and/or routers.

In the era of low latency trading, in which microseconds or even nanoseconds are consequential, market participants sending trades over electronic trading systems are very sensitive to latency, preferring low, predictable latency. The need to share a computing network and traverse through a shared switch or router can increase the average latency, and may also result in unpredictable spikes in latency during heavier trading periods.

SUMMARY

Distributed computing environments, such as an electronic trading system for a financial market, in which order dependent operations are performed in parallel on multiple computing nodes, may make use of a sequencer. To ensure that operations on incoming messages are not performed out of order, incoming messages received at one or more gateways typically pass through the sequencer, which marks each of the messages with a unique, typically monotonically increasing, identifier. The identifier is used in the course of subsequent processing throughout the distributed system to determine the relative ordering among messages. Once sequenced, the marked messages are typically then forwarded by the sequencer to other downstream computing nodes to perform potentially order dependent processing on the messages. Such an architecture is important to ensure a perfect ordering throughout the distributed system. This type of architecture in which every message is sequenced by a unique sequencer may be required for "state determinism," to provide fault-tolerance, high availability and disaster recoverability. One potential drawback, however, is that the sequencer can become a performance bottleneck when all incoming messages are first sent to the sequencer before further processing can take place in the computing nodes.

To minimize the impact of the sequencer while still ensuring proper ordering is maintained throughout the distributed system, example embodiments may implement features to bypass a sequencer. In one embodiment, incoming messages received at gateways may be sent in parallel to both the sequencer and to other downstream computing nodes. The downstream computing nodes, in turn, have the opportunity to perform transactional preprocessing on the unsequenced message while awaiting receipt of the corresponding sequenced message from the sequencer. After performing the sequencing operation, the sequencer forwards the sequenced version of the message to the downstream computing nodes. Having now received the sequenced version of the message, a downstream computing node can then make the determination whether the unsequenced message on which it performed transactional preprocessing was received in order, and if so, can continue processing the message, avoiding the need to perform the preprocessing that was already performed on the unsequenced version of the message. If, on the other hand, the downstream computing node determines that the unsequenced version of the message was received out of order, the node can "roll back" the preprocessing it had already performed (or possibly store the results for future use) and continue processing the sequenced message it just received, if applicable. Under such an embodiment, the preprocessing may be atomic and can be canceled or "rolled back," if necessary, with no side effects.

Example embodiments include a method of processing messages within a distributed system. At a gateway, a message may be sent concurrently to a sequencer and a compute node. At the sequencer, an identifier may be associated with the message indicating a relative sequence of the message among a plurality of messages, and the message or representation thereof may be sent, with the identifier, to the compute node. At the compute node, the message may be processed to generate a preliminary result. Based on the identifier, it may be determined whether the compute node processed the message in sequence or out of sequence relative to another message of the plurality of messages. In response to a determination that the message was received out of sequence, a sequence of messages including the message and a message preceding the message may be processed.

In response to a determination that the message was received in sequence, the message may be continued to be processed at the compute node, based on the preliminary result, to generate a response. At the compute node, the response may be sent concurrently to the gateway and the sequencer. At the sequencer, an identifier may be associated with the response and the response or a representation thereof may be sent with the identifier to the gateway. At the sequencer, an identifier may be associated with the response and the response or a representation thereof may be sent with the identifier to the compute node. At the gateway, the response may be ordered relative to a plurality of responses based on the sequenced version of the response.

The compute node may be a first compute node, and, at the gateway, the message may be sent concurrently to a plurality of compute nodes including the first compute node. At the first compute node, it may be determined whether to process the message based on a value of a common parameter of the message. The plurality of messages may be associated with transactions of financial assets, the value corresponding to a respective financial asset or a transaction type. At the sequencer, the identifier may be sent to the gateway. At the gateway, a response from the compute node may be ordered relative to a plurality of responses based on sequence information determined by the sequencer. Processing the message may include loading data associated with the message to a memory.

Further embodiments include a method of processing messages within a distributed system. At a compute node, a message may be processed to generate a preliminary result, the message received by the compute node and a sequencer. Based on a sequenced message generated by the sequencer, it may be determined whether the compute node processed the message in sequence or out of sequence relative to another of the plurality of messages. In response to a determination that the message was received out of sequence, a sequence of messages including the message and a message preceding the message may be processed.

Further embodiments include a distributed system for processing messages, the distributed system comprising a gateway, a sequencer, and a compute node. The gateway may be configured to send a message to the sequencer and the compute node. The sequencer may be configured to associate the message with an identifier indicating a relative sequence of the message among a plurality of messages. The compute node may be configured to process the message to generate a preliminary result, and determine, based on the identifier, whether the compute node processed the message in sequence or out of sequence relative to another message of the plurality of messages. In response to a determination that the message was received out of sequence, the compute node may process a sequence of messages including the message and a message preceding the message.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Example embodiments disclosed herein relate to a high-speed electronic trading system that provides a market where orders to buy and sell financial instruments (such as stocks, bonds, commodities, futures, options, and the like) are traded among market participants (such as traders and brokers). The electronic trading system exhibits low latency, fairness, fault tolerance, and other features more fully described below.

The electronic trading system is primarily responsible for "matching" orders to one another. In one example, an offer to "buy" an instrument is matched to a corresponding counteroffer to "sell". The matched offer and counteroffer must at least partially satisfy the desired price, with any residual unsatisfied quantity passed to another suitable counterorder. Matched orders are then paired and the trade is executed.

Any wholly unsatisfied or partially satisfied orders are maintained in a data structure referred to as an "order book". The retained information regarding unmatched orders can be used by the matching engine to satisfy subsequent orders. An order book is typically maintained for each instrument and generally defines or otherwise represents the state of the market for that particular product. It may include, for example, the recent prices and quantities at which market participants have expressed a willingness to buy or sell.

The results of matching may also be made visible to market participants via streaming data services referred to as market data feeds. A market data feed typically includes individual messages that carry the pricing for each traded instrument, and related information such as volume and other statistics.

Figure 1:
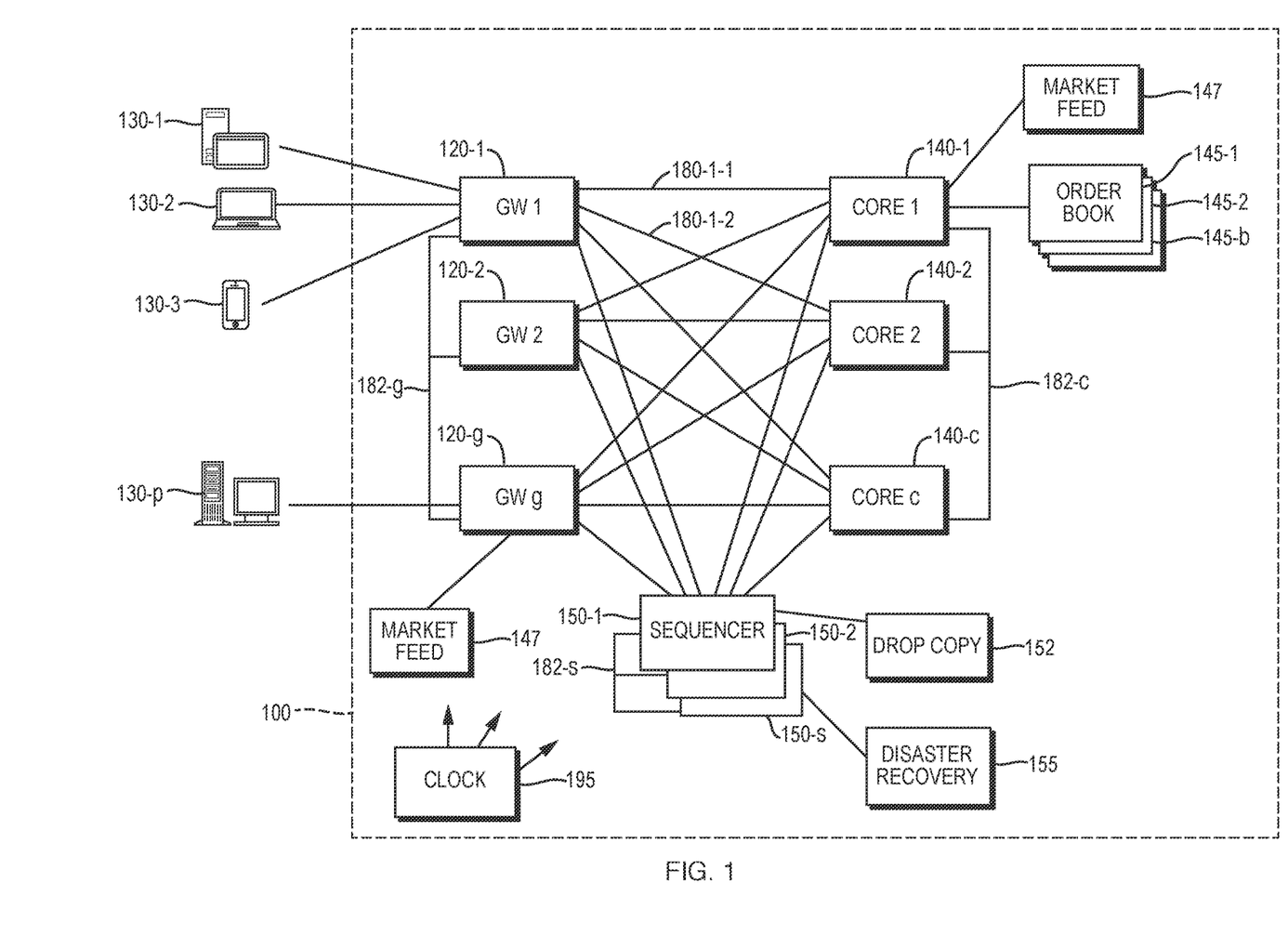
FIG. 1 is a block diagram of an electronic trading system in which example embodiments may be implemented.

FIG. 1 illustrates an example electronic trading system 100 that includes a number of gateways 120-1, 120-2, . . . , 120-g (collectively referred to as gateways 120), a set of core compute nodes 140-1, 140-2, . . . , 140-c (collectively, the core compute nodes 140 or compute nodes 140), and one or more sequencers 150-1, 150-2, . . . , 150-s (collectively, the sequencers 150). In some embodiments, the gateways 120, core compute nodes 140, and sequencers 150 are thus considered to be nodes in electronic trading system 100. As will be described in more detail below, in one embodiment, the gateways 120, compute nodes 140 and sequencers 150 are directly connected to one another, preferably via low latency, dedicated connections 180.

The term "peer" in relation to the discussion of the system 100 refers to another device that generally serves the same function (e.g., "gateway" vs. "core compute node" vs. "sequencer") in electronic trading system 100. For example, gateways 120-2, . . . , 120-g are the peers for gateway 120-1, core compute nodes 140-2, . . . , 140-c are the peers for core compute node 140-1, and sequencers 150-2, . . . , 150-s are the peers for sequencer 150-1.

The electronic trading system 100 processes orders from and provides related information to one or more participant computing devices 130-1, 130-2, . . . , 130-p (collectively, the participant devices 130). Participant devices 130 interact with the system 100, and may be one or more personal computers, tablets, smartphones, servers, or other data processing devices configured to display and receive trade order information. The participant devices 130 may be operated by a human via a graphical user interface (GUI), or they may be operated via high-speed automated trading methods running on some physical or virtual data processing platform.

Each participant device 130 may exchange messages with (that is, send messages to and receive messages from) the electronic trading system 100 via connections established with a gateway 120. While FIG. 1 illustrates each participant device 130 as being connected to electronic trading system 100 via a single connection to a gateway 120, it should be understood that a participant device 130 may be connected to electronic trading system 100 over multiple connections to one or more gateway devices 120.

Note that, while each gateway 120-1 may serve a single participant device 130, it typically serves multiple participant devices 130.

The compute nodes 140-1, 140-2, . . . , 140-n (also referred to herein as matching engines 140 or compute engines 140) provide the matching functions described above and may also generate outgoing messages to be delivered to one or more participant devices 130. Each compute node 140 is a high-performance data processor and typically maintains one or more data structures to search and maintain one or more order books 145-1, . . . , 145-b. An order book 145-1 may be maintained, for example, for each instrument for which the core compute node 140-1 is responsible. One or more of the compute nodes 140 and/or one or more of the gateways 120 may also provide market data feeds 147. Market data feeds 147 may be broadcast (for example, multicast), to subscribers, which may be participant devices 130 or any other suitable computing devices.

Some outgoing messages generated by core compute nodes 140 may be synchronous, that is, generated directly by a core compute node 140 in response to one or more incoming messages received from one or more participant devices 130, such as an outgoing "acknowledgement message" or "execution message" in response to a corresponding incoming "new order" message. In some embodiments, however, at least some outgoing messages may be asynchronous, initiated by the trading system 100, for example, certain "unsolicited" cancel messages and "trade break" or "trade bust" messages.

Distributed computing environments, such as the electronic trading system 100, can be configured with multiple matching engines operating in parallel on multiple compute nodes 140.

The sequencers 150 ensure that the proper sequence of any order-dependent operations is maintained. To ensure that operations on incoming messages are not performed out of order, incoming messages received at one or more gateways 120, for example, a new trade order message from one of participant devices 130, typically must then pass through at least one sequencer 150 in which they are marked with a sequence identifier. That identifier may be a unique, monotonically increasing value which is used in the course of subsequent processing throughout the distributed system 100 (e.g., electronic trading system 100) to determine the relative ordering among messages and to uniquely identify messages throughout electronic trading system 100. It should be understood, however, that while unique, the identifier is not limited to a monotonically increasing or decreasing value. Once sequenced, the marked incoming messages, that is the sequence-marked messages, are typically then forwarded by sequencer(s) 150 to other downstream compute nodes 140 to perform potentially order-dependent processing on the messages.

In some embodiments, messages may also flow in the other direction, that is, from a core compute node 140 to one or more of the participant devices 130, passing through one or more of the gateways 120. Such outgoing messages generated by a core compute node 140 may also be order-dependent, and accordingly may also typically first pass through a sequencer 150 to be marked with a sequence identifier. The sequencer 150 may then forward the marked response message to the gateways 120 in order to pass on to participant devices 130 in a properly deterministic order.

The use of a sequencer 150 to generate unique sequence numbers ensures the correct ordering of operations is maintained throughout the distributed system 100, regardless of which compute node or set of compute nodes 140 processes the messages. This approach provides "state determinism," to provide fault-tolerance, high availability and disaster recoverability.

It may also be important for a generating node (i.e., a node introducing a new message into the electronic trading system 100, for example by generating a new message and/or by forwarding a message received from a participant device 130) and its peer nodes to receive the sequence number assigned to that message. Receiving the sequence number for a message it generated may be useful to the generating node and its peer nodes not only for processing messages in order according to their sequence numbers, but also to correlate the message generated by the node with the message's identifier that is used throughout the rest of the electronic trading system 100. A subsequent message generated within the electronic trading system 100, while also being assigned its own sequence number, may yet reference one or more sequence numbers of related preceding messages. Accordingly, a node may need to quickly reference (by sequence number) a message the node had itself previously generated, because, for example, the sequence number of the message the node had generated was referenced in a subsequent message.

In some embodiments, the generating node may first send a message to the sequencer 150 and wait to receive the sequence number from the sequencer before the generating node forwards the message to other nodes in electronic trading system 100.

In alternate example embodiments, to avoid at least one hop, which could add undesirable increased latency within electronic trading system 100, after receiving the un-sequenced message from the generating node, sequencer 150 may not only send a sequenced version of the message (e.g., a sequence-marked message) to destination nodes, but may also send substantially simultaneously a sequenced version of the message back to the sending node and its peers. For example, after assigning a sequence number to an incoming message sent from the gateway 120-1 to core compute nodes 140, the sequencer 150 may not only forward the sequenced version of the message to the core compute nodes 140, but may also send a sequenced version of that message back to the gateway 120-1 and the other gateways 120. Accordingly, if any subsequent message generated in a core compute node 140 references that sequence number, any gateway 120 may easily identify the associated message originally generated by gateway 120-1 by its sequence number.

Similarly, in some further embodiments, a sequenced version of an outgoing message generated by and sent from a core compute node 140 to gateways 120, and sequenced by sequencer 150, may be forwarded by sequencer 150 both to gateways 120 and back to core compute nodes 140.

Some embodiments may include multiple sequencers 150 for high availability, for example, to ensure that another sequencer is available if the first sequencer fails. For embodiments with multiple sequencers 150 (e.g., a currently active sequencer 150-1, and one or more standby sequencers 150-2, . . . , 150-$s$), the currently active sequencer 150-1 may maintain a system state log (not shown) of all the messages that passed through sequencer 150-1, as well as the messages' associated sequence numbers. This system state log may be continuously or periodically transmitted to the standby sequencers to provide them with requisite system state to allow them to take over as an active sequencer, if necessary.

The system state log may also be continually or periodically replicated to one or more sequencers in a standby replica electronic trading system (not shown in detail) at a disaster recovery site 155, thereby allowing electronic trading to continue with the exact same state at the disaster recovery site 155, should the primary site of system 100 suffer catastrophic failure.

In some embodiments, the system state log may also be provided to a drop copy service 152, which may be implemented by one or more of the sequencers, and/or by one or more other nodes in the electronic trading system 100. The drop copy service 152 may provide a record of daily trading activity through electronic trading system 100 that may be delivered to regulatory authorities and/or clients, who may, for example be connected via participant devices 130. In alternate embodiments, the drop copy service 152 may be implemented on one or more gateways 120. Furthermore, in addition to or instead of referencing the system state log, the drop copy service 152 may provide the record of trading activity based on the contents of incoming and outgoing messages sent throughout electronic trading system 100. For example, in some embodiments, a gateway 120 implementing the drop copy service 152 may receive from the sequencer 150 (and/or from core compute nodes 140 and other gateways 120) all messages exchanged throughout the electronic trading system 100. A participant device 130 configured to receive the record of daily trading activity from the drop copy service 152 may not necessarily also be sending orders to and utilizing a matching function of electronic trading system 100.

Messages exchanged between participant devices 130 and gateways 120 may be according to any suitable protocol that may be used for financial trading (referred to for convenience as, "financial trading protocol"). For example, the messages may be exchanged according to custom protocols or established standard protocols, including both binary protocols (such as Nasdaq OUCH and NYSE UTP), and text-based protocols (such as NYSE FIX CCG). In some embodiments, the electronic trading system 100 may support exchanging messages simultaneously according to multiple financial trading protocols, including multiple protocols simultaneously on the same gateway 120. For example, participant devices 130-1, 130-2, and 130-3 may simultaneously have established trading connections and may be exchanging messages with gateway 120-1 according to Nasdaq Ouch, NYSE UTP, and NYSE FIX CCG, respectively.

Furthermore, in some embodiments, the gateways 120 may translate messages according to a financial trading protocol received from a participant device 130 into a normalized message format used for exchanging messages among nodes within the electronic trading system 100. The normalized trading format may be an existing protocol or may generally be of a different size and data format than that of any financial trading protocol used to exchange messages with participant devices 130. For example, the normalized trading format, when compared to a financial trading protocol of the original incoming message received at the gateway 120 from a participant 130, may include in some cases one or more additional fields or parameters, may omit one or more fields or parameters, and/or each field or parameter of a message in the normalized format may be of a different data type or size than the corresponding message received at gateway 120 from the participant device 130. Similarly, in the other direction, gateways 120 may translate outgoing messages generated in the normalized format by electronic trading system 100 into messages in the format of one or more financial trading protocols used by participant devices 130 to communicate with gateways 120.

In the era of high-speed trading, in which microseconds or even nanoseconds are consequential, participants 130 exchanging messages with the electronic trading system 100 are often very sensitive to latency, preferring low, predictable latency. The arrangement shown in FIG. 1 accommodates this requirement by providing a point-to-point mesh 172 architecture between at least each of the gateways 120 and each of the compute nodes 140. In some embodiments, each gateway 120 in the mesh 172 may have a dedicated high-speed direct connection 180 to the compute nodes 140 and the sequencers 150.

For example, dedicated connection 180-1-1 is provided between gateway 1 120-1 and core compute node 1 140-1, dedicated connection 180-1-2 between gateway 1 120-1 and compute node 2 140-2, and so on, with example connection 180-g-c provided between gateway 120-g and compute node 140-c, and example connection 180-s-c provided between sequencer 150 and core c 140-c.

It should be understood that each dedicated connection 180 in the mesh 172 is, in some embodiments, a point-to-point direct connection that does not utilize a shared switch.

A dedicated or direct connection may be referred to interchangeably herein as a direct or dedicated "link" and is a direct connection between two end points that is dedicated (e.g., non-shared) for communication therebetween. Such a dedicated/direct link may be any suitable interconnect(s) or interface(s), such as disclosed further below, and is not limited to a network link, such as wired Ethernet network connection or other type of wired or wireless network link. The dedicated/direct connection/link may be referred to herein as an end-to-end path between the two end points. Such an end-to-end path may be a single connection/link or may include a series of connections/links; however, bandwidth of the dedicated/direct connection/link in its entirety, that is, from one end point to another end point, is non-shared and neither bandwidth nor latency of the dedicated/direct connection/link can be impacted by resource utilization of element(s) if so traversed. For example, the dedicated/direct connection/link may traverse one or more buffer(s) or other elements that are not bandwidth or latency impacting based on utilization thereof. The dedicated/direct connection/link would not, however, traverse a shared network switch as such a switch can impact bandwidth and/or latency due to its shared usage.

For example, in some embodiments, the dedicated connections 180 in the mesh 172 may be provided in a number of ways, such as a 10 Gigabit Ethernet (GigE), 25 GigE, 40 GigE, 100 GigE, InfiniBand, Peripheral Component Interconnect-Express (PCIe), RapidIO, Small Computer System Interface (SCSI), FireWire, Universal Serial Bus (USB), High Definition Multimedia Interface (HDMI), or custom serial or parallel busses.

Therefore, although the compute engines 140, gateways 120, sequencers 150 and other components may sometimes be referred to herein as "nodes", the use of terms such as "compute node" or "gateway node" or "sequencer node" or "mesh node" should not be interpreted to mean that particular components are necessarily connected using a network link, since other types of interconnects or interfaces are possible. Further, a "node," as disclosed herein, may be any suitable hardware, software, firmware component(s), or combination thereof, configured to perform the respective function(s) set forth for the node. As explained in more detail below, a node may be a programmed general purpose processor, but may also be a dedicated hardware device, such as a field programmable gate array (FPGA), application specific integrated circuit (ASIC), or other hardware device or group of devices, logic within a hardware device, printed circuit board (PCB), or other hardware component.

It should be understood that nodes disclosed herein may be separate elements or may be integrated together within a single element, such as within a single FPGA, ASIC, or other element configured to implement logic to perform the functions of such nodes as set forth herein. Further, a node may be an instantiation of software implementing logic executed by general purpose computer and/or any of the foregoing devices.

Conventional approaches to connecting components, such as the compute engines 140, gateways 120, and sequencers 150 through one or more shared switches, do not provide the lowest possible latency. These conventional approaches also result in unpredictable spikes in latency during periods of heavier message traffic.

In an example embodiment, dedicated connections 180 are also provided directly between each gateway 120 and each sequencer 150, and between each sequencer 150 and each core compute node 140. Furthermore, in some embodiments, dedicated connections 180 are provided among all the sequencers, so that an example sequencer 150-1 has a dedicated connection 180 to each other sequencer 150-2, . . . , 150-s. While not pictured in FIG. 1, in some embodiments, dedicated connections 180 may also be provided among all the gateways 120, so that each gateway 120-1 has a dedicated connection 180 to each other gateway 120-2, . . . , 120-g. Similarly, in some embodiments, dedicated connections 180 are also provided among all the compute nodes 140, so that an example core compute node 140-1 has a dedicated connection 180 to each other core compute node 140-2, . . . , 140-c.

It should also be understood that a dedicated connection 180 between two nodes (e.g., between any two nodes 120, 150, or 140) may in some embodiments be implemented as multiple redundant dedicated connections between those same two nodes, for increased redundancy and reliability. For example, the dedicated connection 180-1-1 between gateway 120-1 and core compute node 140-1 (e.g., Core 1) may actually be implemented as a pair of dedicated connections.

In addition, according to some embodiments, any message sent out by a node is sent out in parallel to all nodes directly connected to it in the point-to-point mesh 172. Each node in the mesh 172 may determine for itself, for example, based on the node's configuration, whether to take some action upon receipt of a message, or whether instead simply to ignore the message. In some embodiments, a node may never completely ignore a message; even if the node, due to its configuration, does not take substantial action upon receipt of a message, it may at least take minimal action, such as consuming any sequence number assigned to the message by the sequencer 150. That is, in such embodiments, the node may keep track of a last received sequence number to ensure that when the node takes more substantial action on a message, it does so in proper sequenced order.

For example, a message containing an order to "Sell 10 shares of Microsoft at $190.00" might originate from participant device 130-1, such as a trader's personal computer, and arrive at gateway 120-1 (i.e., GW 1). That message will be sent to all core compute nodes 140-1, 140-2, . . . , 140-c even though only core compute node 140-2 is currently performing matching for Microsoft orders. All other core compute nodes 140-1, 140-3, . . . , 140-c may upon receipt ignore the message or only take minimal action on the message. For example, the only action taken by 140-1, 140-3, . . . , 140-c may be to consume the sequence number assigned to the message by the sequencer 150-1. That message will also be sent to all of the sequencers 150-1, 150-2, . . . , 150-s even though a single sequencer (in this example, sequencer 150-1) is the currently active sequencer servicing the mesh. The other sequencers 150-2, . . . , 150-s also received the message to allow them the opportunity to take over as the currently active sequencer should sequencer 150-1 (the currently active sequencer) fail, or if the overall reliability of the electronic trading system 100 would increase by moving to a different active sequencer. One or more of the other sequencers (sequencer 150-2 for example) may also be responsible for relaying system state to the disaster recovery site 155. The disaster recovery site 155 may include a replica of electronic trading system 100 at another physical location, the replica comprising physical or virtual instantiations of some or all of the individual components of electronic trading system 100.

By sending each message out in parallel to all directly connected nodes, the system 100 reduces complexity and also facilitates redundancy and high availability. If all directly connected nodes receive all messages by default, multiple nodes can be configured to take action on the same message in a redundant fashion. Returning to the example above of the order to "Sell 10 shares of Microsoft at $190.00", in some embodiments, multiple core compute nodes 140 may simultaneously perform matching for Microsoft orders. For example, both core compute node 140-1 and core compute node 140-2 may simultaneously perform matching for Microsoft messages, and may each independently generate, after having received the incoming message of the "Sell" order, a response message such as an acknowledgement or execution message that each of core compute node 140-1 and core compute node 140-2 sends to the gateways 120 through the sequencer(s) 150 to be passed on to one or more participant devices 130.

Because of the strict ordering and state determinism assured by the sequencer(s) 150, it is possible to guarantee that each of the associated response messages independently generated by and sent from the core compute nodes 140-1 and 140-2 are substantially equivalent; accordingly, the architecture of electronic trading system 100 readily supports redundant processing of messages, which increases the availability and resiliency of the system. In such embodiments, gateways 120 may receive multiple associated outgoing messages from core compute nodes 140 for the same corresponding incoming message. Due to the fact that it can be guaranteed that these multiple associated response messages are equivalent, the gateways 120 may simply process only the first received outgoing message, ignoring subsequent associated outgoing messages corresponding to the same incoming message. In some embodiments, the "first" and "subsequent" messages may be identified by their associated sequence numbers, as such messages are sequence-marked messages. Allowing the gateways 120 to take action on the first of several associated response messages to reach them may therefore also improve the overall latency of the system.

Such a point-to-point mesh 172 architecture of system 100, besides supporting low, predictable latency and redundant processing of messages, also provides for built-in redundant, multiple paths. As can be seen, there exist multiple paths between any gateway 120 and any compute node 140. Even if a direct connection 180-1-1 between gateway 120-1 and compute node 140-1 becomes unavailable, communication is still possible between those two elements via an alternate path, such as by traversing one of the sequencers 150 instead. Thus, more generally speaking, there exist multiple paths between any node and any other node in the mesh 172.

Furthermore, this point-to-point mesh architecture inherently supports another important goal of a financial trading system, namely, fairness. The point-to-point architecture with direct connections between nodes ensures that the path between any gateway 120 and any core compute node 140, or between the sequencer 150 and any other node has identical or, at least very similar latency. Therefore, two incoming messages sent out to the sequencer 150 at the same time from two different gateways 120 should reach the sequencer 150 substantially simultaneously. Similarly, an outgoing message being sent from a core compute node 140 is sent to all gateways 120 simultaneously, and should be received by each gateway at substantially the same time. Because the topology of the point-to-point mesh does not favor any single gateway 120, chances are minimized that being connected to a particular gateway 120 may give a participant device 130 an unfair advantage or disadvantage.

Additionally, the point-to-point mesh architecture of system 100 allows for easily reconfiguring the function of a node, that is, whether a node is currently serving as a gateway 120, core compute node 140 or sequencer 150. It is particularly easy to perform such reconfiguration in embodiments in which each node has a direct connection between itself and each other node in the point-to-point mesh. When each node is connected via a direct connection to each other node in the mesh, no re-wiring or re-cabling of connections 180 (whether physical or virtual) within the point-to-point mesh 172 is required in order to change the function of a node in the mesh (for example, changing the function of a node from a core compute node 140 to a gateway 120, or from a gateway 120 to a sequencer 150). In such embodiments, the reconfiguration required that is internal to the mesh 172 may be easily accomplished through configuration changes that are carried out remotely. In the case of a node being reconfigured to serve as a new gateway 120 or being reconfigured from serving as a gateway 120 to another function, there may be some ancillary networking changes required that are external to the mesh 172, but the internal wiring of the mesh may remain intact.

Accordingly, in some embodiments, the reconfiguration of the function of a node may be accomplished live, even dynamically, during trading hours. For example, due to changes on characteristics of the load of electronic trading system 100 or new demand, it may be useful to reconfigure a core compute node 140-1 to instead serve as an additional gateway 120. After some possible redistribution of state or configuration to other compute nodes 140, the new gateway 120 may be available to start accepting new connections from participant devices 130.

In some embodiments, lower-speed, potentially higher latency shared connections 182 may be provided among the system components, including among the gateways 120 and/or the core compute nodes 140. These shared connections 182 may be used for maintenance, control operations, management operations, and/or similar operations that do not require very low latency communications, in contrast to messages related to trading activity carried over the dedicated connections 180 in the mesh 172. Shared connections 182, carrying non-trading traffic, may be over one or more shared networks and via one or more network switches, and nodes in the mesh may be distributed among these shared networks in different ways. For example, in some embodiments, gateways 120 may all be in a gateway-wide shared network 182-g, compute nodes 140 may be in their own respective compute node-wide shared network 182-c, and sequencers 150 may be in their own distinct sequencer-wide shared network 182-s, while in other embodiments all the nodes in the mesh may communicate over the same shared network for these non-latency sensitive operations.

Distributed computing environments such as electronic trading system 100 sometimes rely on high resolution clocks to maintain tight synchronization among various components. To that end, one or more of the nodes 120, 140, 150 might be provided with access to a clock, such as a high-resolution GPS clock 195 in some embodiments.

Figure 2:
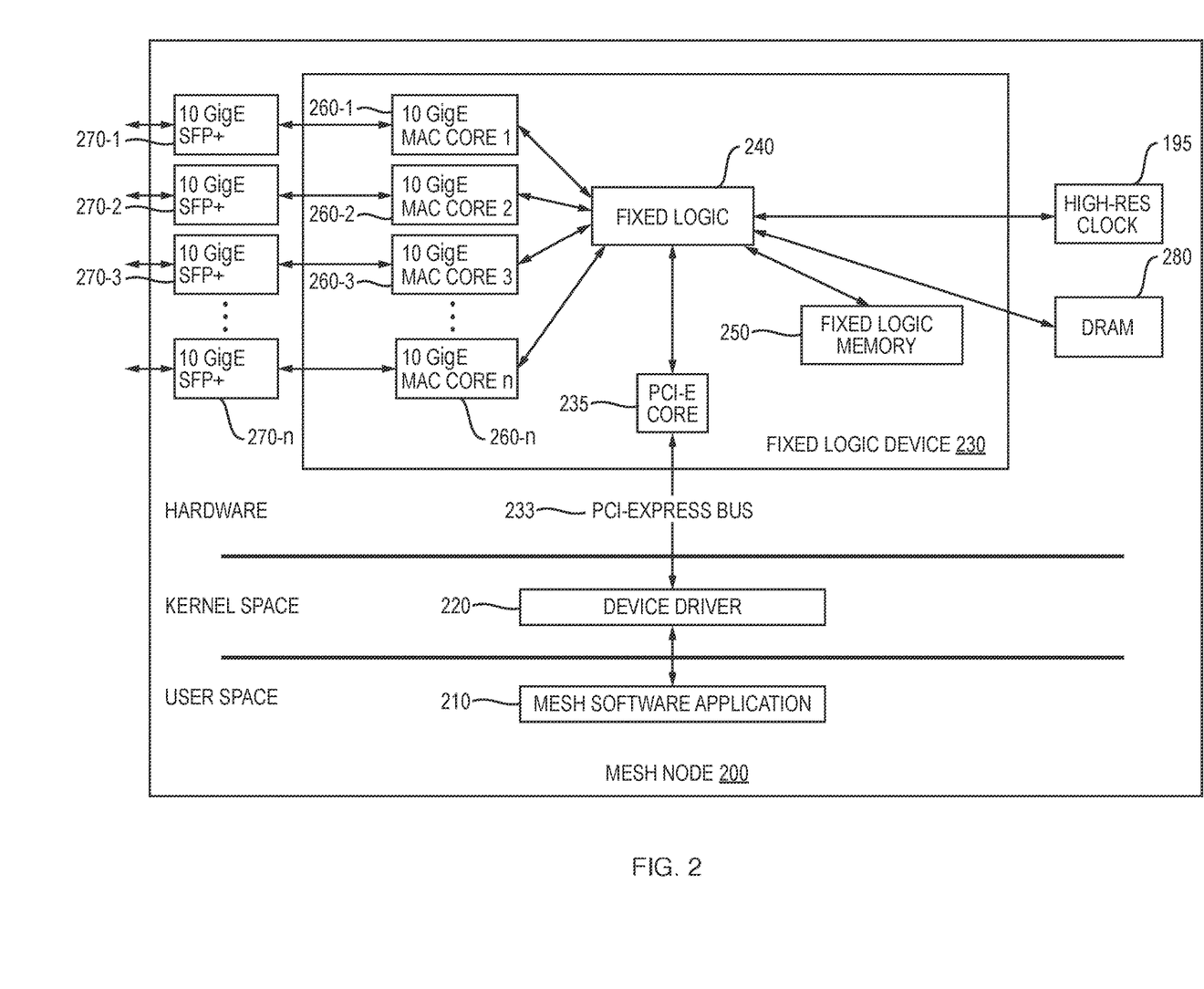
FIG. 2 is a block diagram of a mesh node in an example embodiment.

For purposes of the following discussion, gateways 120, compute nodes 140, and sequencers 150 connected in the mesh 172 may be referred to as "Mesh Nodes". FIG. 2 illustrates an example embodiment of a Mesh Node 200 in the point-to-point mesh 172 architecture of electronic trading system 100. Mesh node 200 could represent a gateway 120, a sequencer 150, or a core compute node 140, for example. Although in this example, functionality in the Mesh Node 200 is distributed across both hardware and software, Mesh Node 200 may be implemented in any suitable combination of hardware and software, including pure hardware and pure software implementations, and in some embodiments, any or all of gateways 120, compute nodes 140, and/or sequencers 150 may be implemented with commercial off-the-shelf components.

In the embodiment illustrated by FIG. 2, in order to achieve low latency, some functionality is implemented in hardware in Fixed Logic Device 230, while other functionality is implemented in software in Device Driver 220 and Mesh Software Application 210. Fixed Logic Device 230 may be implemented in any suitable way, including an Application-Specific Integrated Circuit (ASIC), an embedded processor, or a Field Programmable Gate Array (FPGA). Mesh Software Application 210 and Device Driver 220 may be implemented as instructions executing on one or more programmable data processors, such as central processing units (CPUs). Different versions or configurations of Mesh Software Application 210 may be installed on Mesh Node 200 depending on its role. For example, based on whether Mesh Node 200 is acting as a gateway 120, sequencer 150, or core compute node 140, a different version or configuration of Mesh Software Application 210 may be installed.

While any suitable physical communications link layer may be employed, (including USB, Peripheral Component Interconnect (PCI)-Express, High Definition Multimedia Interface (HDMI), 10 Gigabit Ethernet (GigE), 25 GigE, 40 GigE, 100 GigE, or InfiniBand (IB), over fiber or copper cables), in this example, Mesh Node 200 has multiple low latency 10 Gigabit Ethernet SFP+ connectors (interfaces) 270-1, 270-2, 270-3, . . . , 270-n, (known collectively as connectors 270). Connectors 270 may be directly connected to other nodes in the point-to-point mesh via dedicated connections 180, connected via shared connections 182, and/or connected to participant devices 130 via a gateway 120, for example. These connectors 270 are electronically coupled in this example to 10 GigE MAC Cores 260-1, 260-2, 260-3, . . . , 260-n, (known collectively as GigE Cores 260), respectively, which in this embodiment are implemented by Fixed Logic Device 230 to ensure minimal latency. In other embodiments, 10 GigE MAC Cores 260 may be implemented by functionality outside Fixed Logic Device 230, for example, in PCI-E network interface card adapters.

In some embodiments, Fixed Logic Device 230 may also include other components. In the example of FIG. 2, Fixed Logic Device 230 also includes a Fixed Logic 240 component. In some embodiments, fixed Logic component 240 may implement different functionality depending on the role of Mesh Node 200, for example, whether it is a gateway 120, sequencer 150, or core compute node 140. Also included in Fixed Logic Device 230 is Fixed Logic Memory 250, which may be a memory that is accessed with minimal latency by Fixed Logic 240. Fixed Logic Device 230 also includes a PCI-E Core 235, which may implement PCI Express functionality. In this example, PCI Express is used as a conduit mechanism to transfer data between hardware and software, or more specifically, between Fixed Logic Device 240 and the Mesh Software Application 210, via Device Driver 220 over PCI Express Bus 233. However, any suitable data transfer mechanism between hardware and software may be employed, including Direct Memory Access (DMA), shared memory buffers, or memory mapping.

In some embodiments, Mesh Node 200 may also include other hardware components. For example, depending on its role in the electronic trading system 100, Mesh Node 200 in some embodiments may also include High-Resolution Clock 195 (also illustrated in and discussed in conjunction with FIG. 1) used in the implementation of high-resolution clock synchronization among nodes in electronic trading system 100. A Dynamic Random-Access Memory (DRAM) 280 may also be included in Mesh Node 200 as an additional memory in conjunction with Fixed Logic Memory 250. DRAM 280 may be any suitable volatile or non-volatile memory, including one or more random-access memory banks, hard disk(s), and solid-state disk(s), and accessed over any suitable memory or storage interface.

Figure 3A:
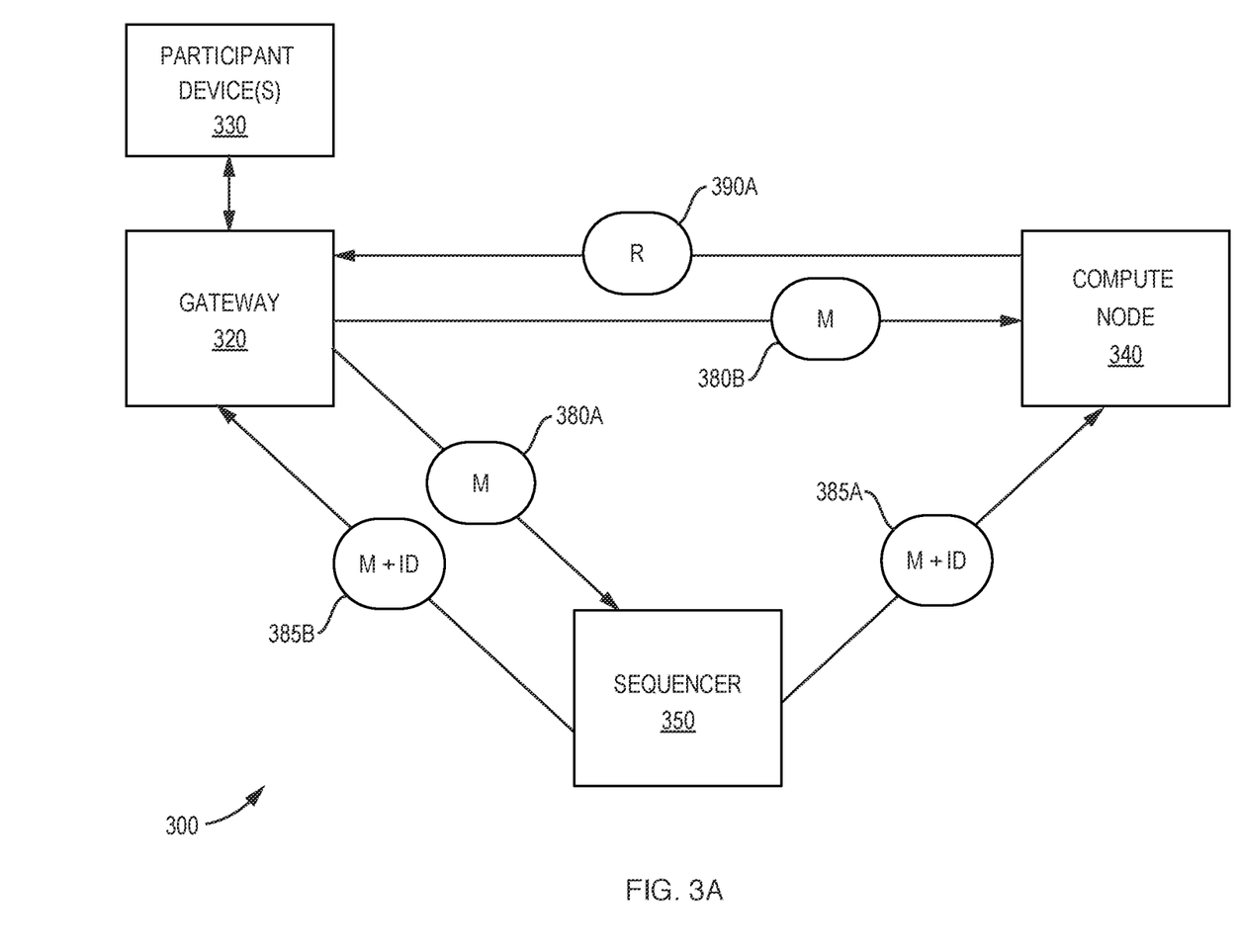
FIGS. 3A-B are block diagrams of distributed systems in which example embodiments may be implemented.
Figure 3B:
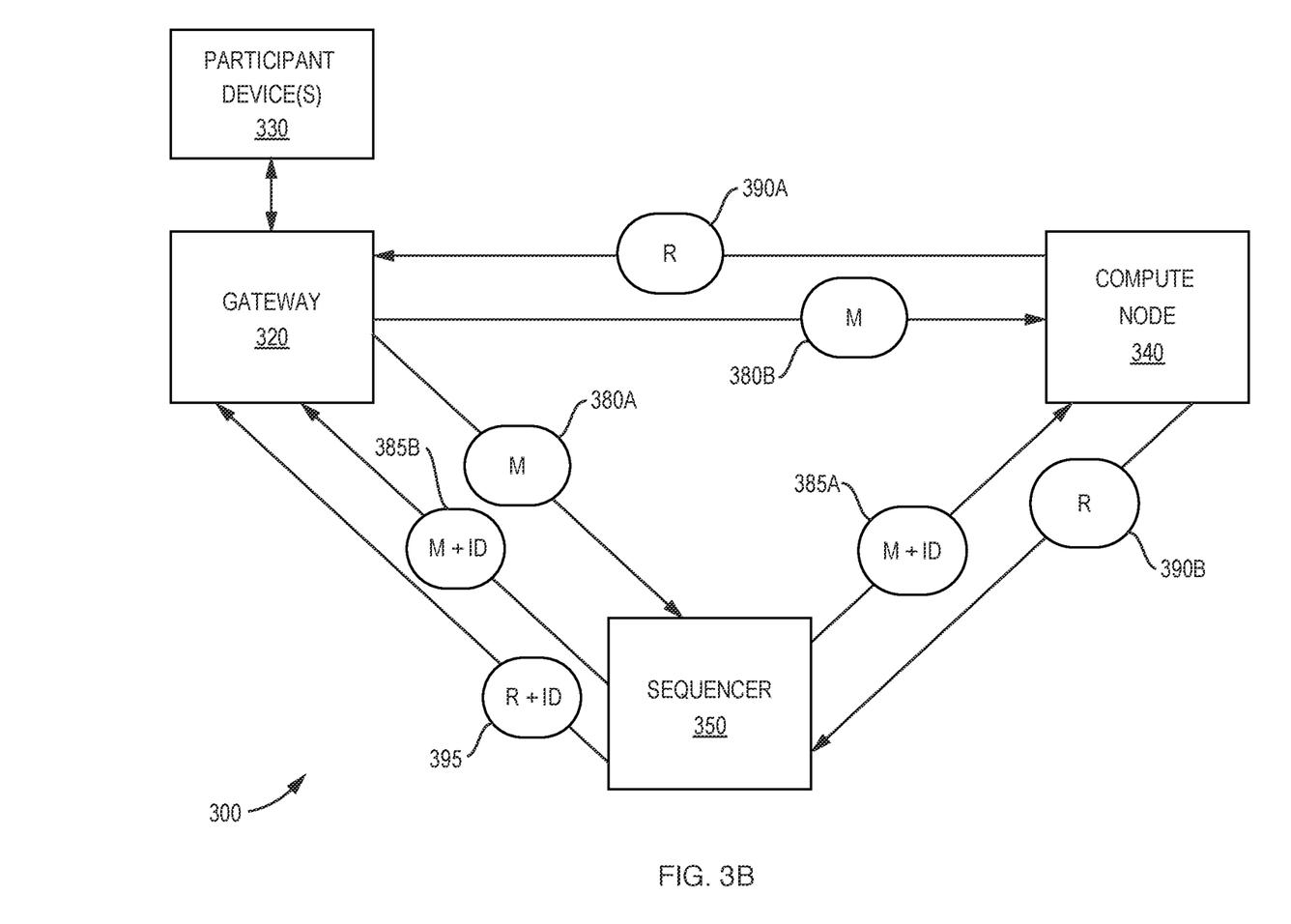

FIGS. 3A-B illustrate a distributed system 300 in which example embodiments may be implemented. The distributed system 300 may include some or all features of the electronic trading system 100 described above with reference to FIGS. 1 and 2. In particular, the distributed system 300 includes a gateway 320, a sequencer 350, and a compute nodes 340, which may incorporate some or all features of the gateways 120, the sequencers 150, and the compute nodes 140, respectively. Although FIGS. 3A-B illustrate a single gateway, sequencer and compute node, the distributed system may include a plurality of gateways, sequencers and nodes such as in the system 100 described above. The gateway 320, sequencer 350, and compute node 340 may each incorporate some or all features of the mesh node 200 described above with reference to FIG. 2.

With reference to FIG. 3A, the distributed system 300 may process messages (e.g., trade orders) from and provide related information to participant computing devices 330. Participant devices 330 may be one or more personal computers, tablets, smartphones, servers, or other data processing devices configured to display and receive information related to the messages (e.g., trade order information). Each participant device 330 may exchange messages with the distributed system 300 via distributed system connections established with the gateway 320. The compute node 340 may process the messages and generate a response. For example, if configured as a matching engine as described above, the compute node 340 may provide the aforementioned matching functions and may also generate outgoing messages to be delivered to one or more of the participant devices 330.

As shown in FIG. 3A, the gateway 320 transmits a message 380A (e.g., from one of the participant devices 330) to the sequencer 350. The message 380A may be one of a sequence of messages that require processing in a given order, yet the message 380A itself may be referred to as "unsequenced" because it lacks an indication of its order within the sequence. The sequencer 350 may associate an identifier with the message 380A, outputting a marked message 385A that includes the message and identifier, or a representation thereof. The identifier may be a unique, monotonically increasing value that is used in the course of subsequent processing throughout the distributed system 300 to determine the relative ordering among messages and to uniquely identify messages throughout the distributed system 300. Once sequenced, the marked message 385A is forwarded by the sequencer 350 to the compute node 340 to perform potentially order-dependent processing on the marked message 385A. The sequencer 350 may also forward a marked message 385B to the gateway 320, which, in turn, may reference the marked message 385B to track the processing of the message 380B by the compute node 340.

Upon completing processing of the marked message 385A, the compute node 340 may return a response 390A to the gateway 320, which in turn, may forward the response or information about the response to the participant computing device(s) 330 originating the message. For example, the compute node 340 may generate a response 390A that informs of a successful match between a buy order and a sell order, thereby indicating a completed trade of a financial instrument. Such replies generated by the compute node 340 may also be order-dependent, and accordingly may also pass through a sequencer 150 to be marked with a sequence identifier. Such a configuration is shown in FIG. 3B, wherein the compute node 340 also sends a response 390B (which may correspond to response 390A) to the sequencer 350. The sequencer 350 may then associate the response 390B with the sequence identifier, and forward a marked response message 395 to the gateway 320 in order to pass on to participant devices 330 in a properly deterministic order.

The use of the sequencer 350 to generate unique sequence numbers ensures that the correct ordering of operations is maintained throughout the distributed system 300, regardless of which compute node(s) processes the messages. This approach provides "state determinism," to provide fault-tolerance, high availability and disaster recoverability. However, the sequencer 350 can become a performance bottleneck when all incoming messages are first sent to the sequencer 350 before further processing can take place at the compute node 340.

To minimize the impact of the sequencer 350 while still ensuring proper ordering is maintained throughout the distributed system 300, example embodiments may implement features to partially bypass the sequencer 350. As shown in FIG. 3A, the gateway 320 may send the same (or functionally equivalent) message in parallel to both the sequencer (as message 380A) and the compute node 340 (as message 380B). The compute node 340, in turn, may be performing transactional preprocessing on the message 380B while awaiting receipt of the corresponding marked message 385A from the sequencer 350. After performing the sequencing operation, the sequencer 350 forwards the marked message 385A to the compute node 340. Having now received the marked message 385A, the compute node 340 can then determine whether the (unsequenced) message 380B on which it performed transactional preprocessing was received in order. If so, the compute node 340 can continue processing the message 380B, avoiding the need to perform the preprocessing that was already performed on the unsequenced version of the message 380B. If, in contrast, the compute node 340 determines that the message 380B was received out of order, the compute node 340 may, in some embodiments, "roll back" the preprocessing it had already performed (or, optionally, store the results for future use) and continue processing the marked (i.e., sequenced) message 385A, if applicable. Under such an embodiment, the preprocessing may be atomic and can be canceled or "rolled back" with no side effects.

FIG. 3B illustrates the distributed system 300 in a configuration comparable to that of FIG. 3A, with the exception that the sequencer 350 operates to sequence both messages from the participant devices 330 and the replies from the compute node 340. As described above, the sequencer 350 may also operate to sequence the response 390B produced by the compute node 340, generating and sending a marked response 395 to the gateway 320. The gateway 320, in turn, may utilize the marked response 395 by ordering the response relative to a plurality of responses based on the marked (i.e., sequenced) version of the response. Under such a configuration, the gateway may also perform transactional preprocessing on the response 390A prior to receiving the marked response 395 in a manner comparable to the preprocessing done by the compute node 340 described above.

Figure 4:
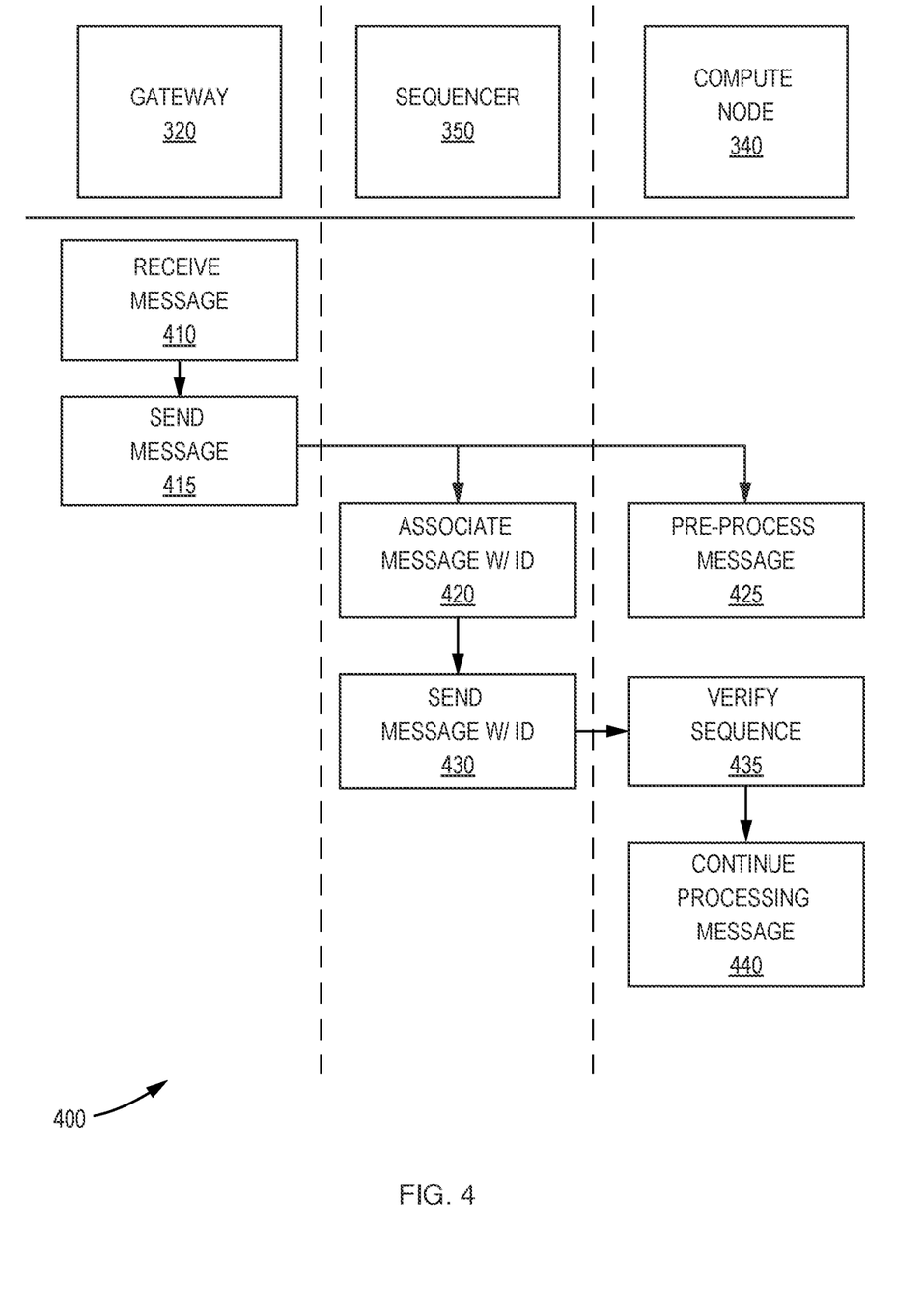
FIG. 4 is a flow diagram illustrating operation of a distributed system in one embodiment.

FIG. 4 illustrates a process 400 that may be carried out by the distributed system 300 to process a message. With reference to FIG. 3A, the gateway 320 may receive a message from one of the participant devices 330 (410), and, in turn, send corresponding messages 380A, 380B to the sequencer 350 and the compute node 340 (415). The gateway 320 may optionally include an identifier generated by the gateway 320 in the messages 380A, 380B, and in a distributed system comprising multiple compute nodes and/or sequencers, the gateway 320 may send a corresponding message to all such nodes. The compute node 340, upon receipt of the message 380B, may first determine whether the message 380B is one that the compute node 340 is assigned to process, and may make this determination based on one or more values or identifiers of the message 380B (e.g., a value of a common parameter, such as a symbol representing a given financial instrument or a type of transaction). If it is assigned to process the message 380B, the compute node 340 may then perform preprocessing on the message (425) to generate a preliminary result. For example, the compute node 350 may load into memory information relating to a value (e.g., symbol for a financial instrument) referenced in the message 380B. Alternatively or additionally, in some embodiments, the preprocessing may include performing a matching function, such as generating a response message including an acknowledgement message or an execution message, making preliminary updates to an order book for a value (e.g., symbol for a financial instrument) referenced in the message 380B, etc. Such preprocessing may be conducted such that it has no adverse side effects, or may, if necessary, be atomically "rolled back" if it is later determined that the message on which preprocessing was performed had been received out of order.

Concurrently, the sequencer 350 may sequence the message 380B, for example by associating the message 380B with an identifier that enables the message 380B to be identified within a sequence of messages, which may be required to be processed in a given order (420). Once complete, the sequencer 350 may send the marked message 385A that includes the message and identifier, or a representation thereof, to the compute node 340 (430). Once the compute node receives the marked message 385A, it can determine whether the (unsequenced) message 380B on which it performed its preprocessing was received in order (435). In the process 400 shown, the message 380B was received in order, and the compute node 340 can proceed to continue processing the message (440). As a result of the preprocessing, the compute node 340 may have already completed some operations that it would have performed after receiving the marked message 385A (e.g., a cache memory lookup of a value), thereby enabling the compute node 340 to complete processing the message sooner than it would have without the preprocessing operation.

Figure 5:
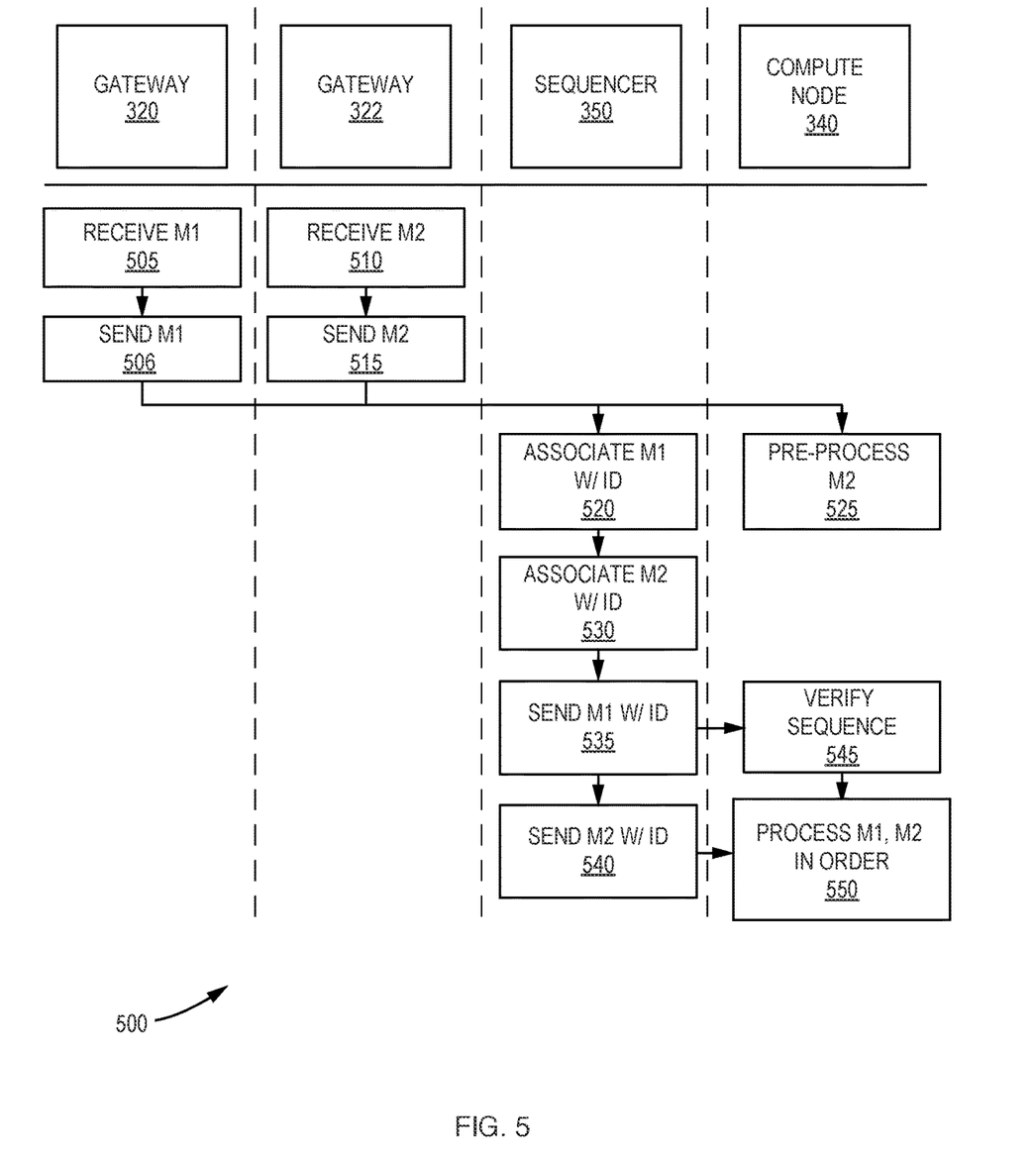
FIG. 5 is a flow diagram illustrating operation of a distributed system in a further embodiment.

FIG. 5 illustrates a process 500 that may be carried out by the distributed system 300 to process a message. In this embodiment, the distributed system 300 includes at least a second gateway, gateway 322. With reference to FIG. 3A, the gateway 320 may receive a first message (M1) from one of the participant devices 330 (505), and, in turn, send corresponding messages (e.g., messages 380A-B) to the sequencer 350 and the compute node 340 (506). The gateway 322 may receive a second message (M2) from one of the participant devices 330 (510), and send corresponding messages to the sequencer 350 and the compute node 340 (510). In this example, the first and second messages belong to a common sequence of messages, such that the relative order in which the first and second messages are processed could affect the state of the distributed system. In the example of FIG. 5, the compute node 340 receives the second message before receiving the first message, and, upon confirming that the second message is one that the compute node 340 is assigned to process, the compute node 340 may then perform preprocessing on the message (525).

The sequencer 350 may receive both the first and second messages. The sequencer 350 may then assign to each of the first and second messages its own unique identifier that may be used to determine the relative ordering or sequence of the first and second messages (520, 530). In some embodiments, the identifier assigned by the sequencer to the message may be a monotonically increasing sequence number. Furthermore, in some embodiments, the value of the identifier assigned to a message by the sequencer may be based on the arrival time of the message at the sequencer. That is, in some embodiments, messages are placed in a First-In-First-Out (FIFO) queue as they are received by the sequencer, and are assigned the identifier as they are removed from the FIFO queue. In the example of FIG. 5, message M1 was received at the sequencer earlier than message M2, and therefore in embodiments in which the identifier is a monotonically increasing sequence number, message M1 is assigned a lower sequence number by the sequencer than message M2. Once the process of assigning an identifier to each message is complete, the sequencer 350 may send marked messages (that is, messages including the identifiers) corresponding to the first and second messages, or a representation, thereof, to the compute node 340 (535, 540). Once the compute node 340 receives the marked messages, it can determine whether the (unsequenced) message 380B on which it performed its preprocessing was received in order (545). In the process 500 shown, the compute node 340 received the second message out of order. In such a result, some or all of the product of the preprocessing (e.g., the cache lookup for the value of a common parameter of the message) may optionally be discarded or, for other types of preprocessing, atomically rolled back. The compute node 340 may then proceed to process both the first and second messages in the order as indicated by the sequencer 350 (550).

Even if it is determined that an unsequenced message was received out of order at the compute node 340, the node 340 may still benefit from performing preprocessing on the message. By preprocessing the message, the compute node 340 has determined that it will likely need to process this message in the future, and can take time-saving, preemptive action, accordingly. For example, information needed to completely process the message, such as information about current open orders for the same stock symbol, may need to be resident in a faster memory (e.g., FPGA memory, such as Fixed Logic Memory 250 illustrated in FIG. 2, or other cache memory) before the message can be fully processed, and if not yet resident in the faster memory, may first require retrieval from a slower memory (e.g., hard disk or DRAM, such as DRAM 280 illustrated in FIG. 2). For a value of a common parameter of the message that has not been referenced recently, this information may not be currently resident in the faster memory, yet the compute node 340 may carry out the memory copy operation in advance even in the event of an out-of-sequence message, thereby saving time when the sequenced message arrives in proper order soon thereafter. Provided that the faster memory is sufficiently large to hold information for multiple values, receiving even a string of multiple consecutive out-of-order messages may be beneficial by enabling the compute node to prefetch information for a number of values in advance. Thus, rather than disregarding the results of a preprocessing operation, the compute node 340 may temporarily preserve the results for reference during a later processing operation.

In some example embodiments, the product of preprocessing by a compute node may still be valid in instances that do not conform to sequential ordering. For example, in an embodiment in which each computing node services a subset of operations, such as a subset of values of a common parameter of the messages (e.g., a limited number of stock symbols or other indicators of financial instruments), the computing node may still receive messages that reference other stock symbols it does not service, yet the order of the sequence may only be relevant to the compute node insofar as it affects values that it services. Further, the ordering of messages referencing different values may be considered independent from one another. Thus, if a message is received out of order relative to another message referencing a different value, no further action regarding the preprocessing (e.g., a rollback) may be necessary, and the preprocessed result may eventually be used without modification and/or committed to the state of the distributed system.

In further embodiments, it may be beneficial or required for the gateway 320 to be informed of the unique system-wide sequence number associated with a message that originated from a client. This information may enable the gateway 320 to match up the original incoming message to the unique sequence number, which is used to ensure proper ordering of messages throughout the distributed system. Such a configuration at the gateway(s) may be required for the distributed system 300 to achieve state determinism and to provide fault-tolerance, high availability and disaster recoverability with respect to the activity in the gateways. One solution for configuring the gateway 320 to maintain information on the sequence number associated with an incoming message is for the gateway 320 to wait for a response back from the sequencer 350 with the sequence number before forwarding the message to the compute node 340. Such an approach may add latency to the processing of messages. In a further example, in addition to forwarding to the compute node 340 a marked message it had originally received from the gateway 320, the sequencer 350 may also send, in parallel, the marked message (e.g., marked message 385B as shown in FIG. 3A) to the gateway 320. As a result, the gateway 320 may maintain information on the sequence identifier while minimizing latency at the distributed system 300.

Figure 6:
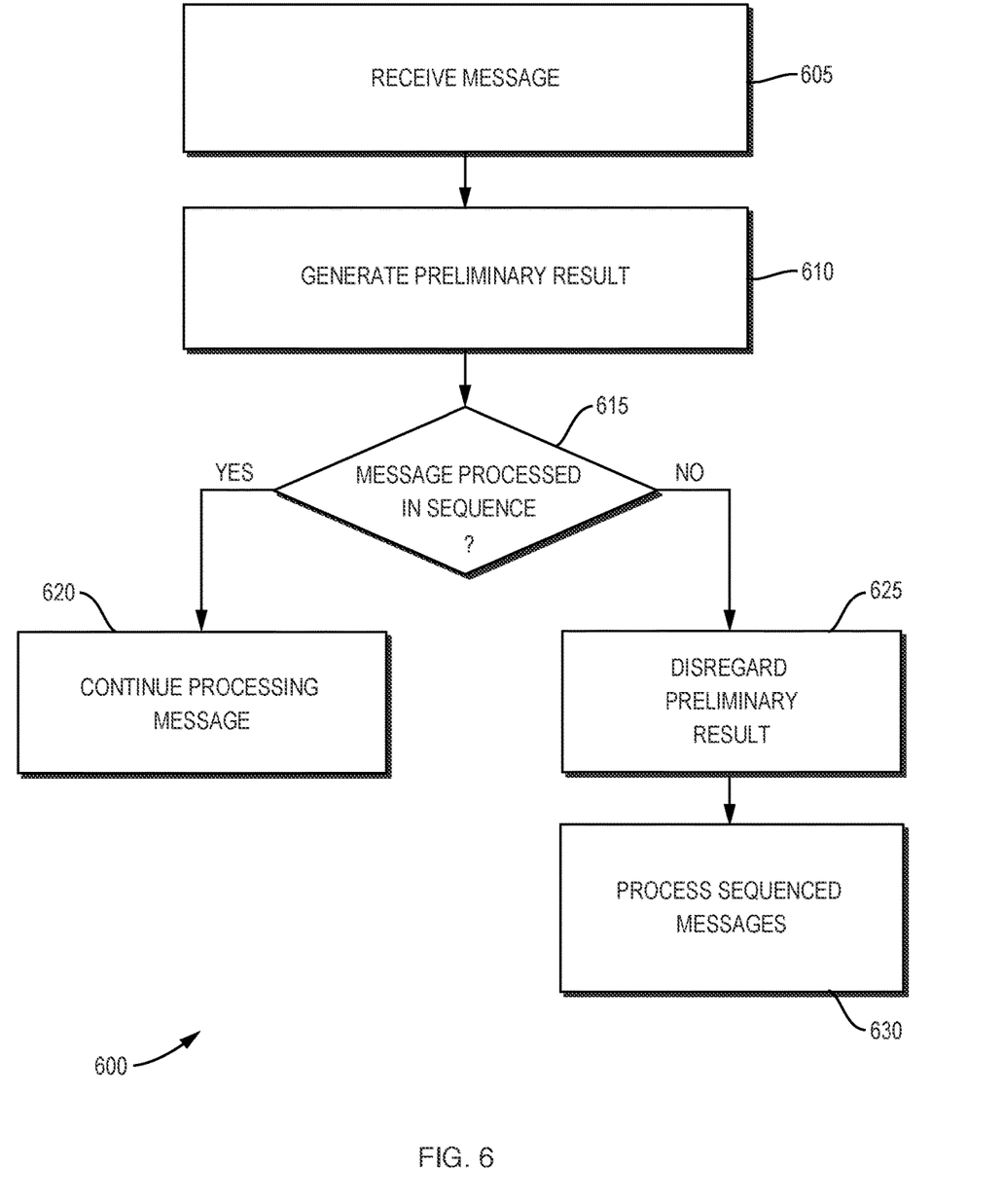
FIG. 6 is a block diagram illustrating a process operated by a compute node in one embodiment.

FIG. 6 illustrates a process 600 that may be operated by a compute node 340 in one embodiment. With reference to FIG. 3A, the compute node 340, upon receipt of a message 380B that it is assigned to process (605), may perform preprocessing on the message 380B (610). Following receipt of a marked message 385A corresponding to the message 380B, the compute node 340 may determine whether the compute node 340 performed the preprocessing in proper sequenced order (615). If so, the compute node 340 can proceed to continue processing the message (620). Otherwise, if the compute node 340 determined that it performed the preprocessing out of order, then the compute node 340, depending on the embodiment and/or the type of preprocessing, may optionally disregard some or all of the preprocessing result, may atomically roll back the preprocessing, or may even maintain or store the preliminary result to be used for later in the continued processing of the message or of other subsequent messages (625). Then, upon receiving the remainder in the sequence of messages, the compute node 340 may then proceed to process the sequenced messages in the order as indicated by the sequencer 350, which, in some embodiments, may entail making use of at least part of the preliminary result from the preprocessing (630).

Example embodiments described above in FIGS. 3-6 may be implemented in a variety of different distributed systems and other distributed computing systems, and may gain particular advantages when implemented in a point-to-point mesh architecture such as that of the system 100 described above with reference to FIGS. 1 and 2. Such a point-to-point mesh architecture as described above may have built-in implicit redundancy, as there is a built-in dual path between any gateway and any computing node (e.g., one path through the sequencer and a second direct, point-to-point path between the two nodes themselves). This architecture also allows for reducing or minimizing the latency occurring at the sequencer. Example embodiments may benefit further when implemented in a distributed system wherein the bandwidth of the communications links between nodes is substantially greater than the processing power of the nodes themselves.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry, disclosed above, or equivalents thereof, firmware, custom designed semiconductor logic, Application Specific Integrated Circuits (ASICs), Field Programmable Gate Arrays (FPGAs), a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as one or more random access memor(ies) (RAMs), read only memor(ies) (ROMs), compact disk read-only memor(ies) (CD-ROMs), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

Accordingly, further embodiments may also be implemented in a variety of computer architectures, physical, virtual, cloud computers, and/or some combination thereof, and thus the data processing systems described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A computer-implemented method of processing messages within a distributed system, the method comprising:
   at a gateway, sending a message to a sequencer via a first communications path and, in parallel, sending the message to a compute node via a second communications path, the second communications path bypassing the sequencer;

at the sequencer, associating an identifier with the message, the identifier having a value corresponding to an arrival time of the message at the sequencer and indicating a relative sequence position of the message among a plurality of messages, and sending the message or representation thereof with the identifier to the compute node;

at the compute node:

processing the message received via the second communications path bypassing the sequencer to generate a preliminary result, the processing being a transactional preprocessing of the message including at least one of 1) loading data relating to a financial instrument referenced in the message to a memory, the preliminary result including cached data relating to the financial instrument referenced in the message, and 2) determining a preliminary update to an order book for the financial instrument referenced in the message;

receiving the message or representation thereof with the identifier via a third communications path connecting the sequencer and the compute node;

determining, based on the identifier indicating a relative sequence position of the message among a plurality of messages, whether the compute node processed the message in sequence or out of sequence relative to another message of the plurality of messages;

in response to a determination, based on the identifier, that the message was received in sequence, further processing the message based on the preliminary result to generate a response; and in response to a determination, based on the identifier, that the message was received by the compute node in a sequence position distinct from the relative sequence position at the sequencer, processing a sequence of messages including the message and a message preceding the message in accordance with the relative sequence.

2. The method of claim 1, further comprising, at the compute node, sending the response to the gateway and the sequencer.

3. The method of claim 2, further comprising, at the sequencer, associating an identifier with the response and sending the response or representation thereof with the identifier to the gateway.

4. The method of claim 2, further comprising, at the sequencer, associating an identifier with the response and sending the response or representation thereof with the identifier to the compute node.

5. The method of claim 3, further comprising, at the gateway, ordering the response relative to a plurality of responses based on the sequenced version of the response.

6. The method of claim 1, wherein the compute node is a first compute node, and further comprising, at the gateway, sending the message to a plurality of compute nodes including the first compute node.

7. The method of claim 6, further comprising, at the first compute node, determining whether to process the message based on a value of a common parameter of the message.

8. The method of claim 6, wherein the plurality of messages are associated with transactions of financial assets, the value corresponding to a respective financial asset or a transaction type.

9. The method of claim 1, further comprising, at the sequencer, sending the identifier to the gateway.

10. The method of claim 1, further comprising, at the gateway, ordering a response from the compute node relative to a plurality of responses based on sequence information determined by the sequencer.

11. A computer-implemented method of processing messages within a distributed system, comprising:

at a compute node:

processing a message received via a communications path bypassing a sequencer to generate a preliminary result, the message received by the sequencer and the compute node in parallel via a first communications path and a second communications path, respectively, the processing being a transactional preprocessing of the message including at least one of 1) loading data relating to a financial instrument referenced in the message to a memory, the preliminary result including cached data relating to the financial instrument referenced in the message, and 2) determining a preliminary update to an order book for the financial instrument referenced in the message;

receiving a sequenced message or representation thereof via a third communications path connecting the sequencer and the compute node, the sequenced message corresponding to an arrival time of the message at the sequencer and indicating a relative sequence position of the message among a plurality of messages, the sequenced message being generated by the sequencer;

determining, based on the sequenced message indicating a relative sequence position of the message among a plurality of messages, whether the compute node processed the message in sequence or out of sequence relative to another of the plurality of messages;

in response to a determination, based on the sequenced message, that the message was received in sequence, further processing the message based on the preliminary result to generate a response; and in response to a determination, based on the sequenced message, that the message was received by the compute node in a sequence position distinct from the relative sequence position at the sequencer, processing a sequence of messages including the message and a message preceding the message in accordance with the relative sequence.

12. The method of claim 11, further comprising, at the compute node, sending the response to a gateway and a sequencer.

13. The method of claim 12, further comprising, at the sequencer, associating an identifier with the response and sending the response or representation thereof with the identifier to the gateway.

14. The method of claim 12, further comprising, at the sequencer, associating an identifier with the response and sending the response or representation thereof with the identifier to the compute node.

15. The method of claim 13, further comprising, at the gateway, ordering the response relative to a plurality of responses based on the sequenced version of the response.

16. The method of claim 12, wherein the compute node is a first compute node, and further comprising, at the gateway, sending the message to a plurality of compute nodes including the first compute node.

17. The method of claim 16, further comprising, at the first compute node, determining whether to process the message based on a value of a common parameter of the message.

18. The method of claim 17, wherein the message is associated with a transaction of a financial asset, the value of the common parameter of the message identifying the financial asset or a transaction type.

19. A distributed system for processing messages, comprising:
- a gateway;
- a sequencer; and
- a compute node, wherein:
  - the gateway is configured to send a message to the sequencer via a first communications path and, in parallel, send the message to the compute node via a second communications path, the second communications path bypassing the sequencer;
  - the sequencer is configured to associate the message with an identifier, the identifier having a value corresponding to an arrival time of the message at the sequencer and indicating a relative sequence position of the message among a plurality of messages; and
  - the compute node is configured to:
    - process the message received via the second communications path bypassing the sequencer to generate a preliminary result, the processing being a transactional preprocessing of the message including at least one of 1) loading data relating to a financial instrument referenced in the message to a memory, the preliminary result including cached data relating to the financial instrument referenced in the message, and 2) determining a preliminary update to an order book for the financial instrument referenced in the message;
    - receive the message or representation thereof with the identifier via a third communications path connecting the sequencer and the compute node;
    - determine, based on the identifier indicating a relative sequence position of the message among a plurality of messages, whether the compute node processed the message in sequence or out of sequence relative to another message of the plurality of messages; and
    - in response to a determination, based on the identifier, that the message was received in sequence, further process the message based on the preliminary result to generate a response; and
    - in response to a determination, based on the identifier, that the message was received by the compute node in a sequence position distinct from the relative sequence position at the sequencer, process a sequence of messages including the message and a message preceding the message in accordance with the relative sequence.

* * * * *